United States Patent
Murai et al.

(10) Patent No.: US 7,319,511 B2
(45) Date of Patent: Jan. 15, 2008

(54) SURVEYING INSTRUMENT AND ELECTRONIC STORAGE MEDIUM

(75) Inventors: Shunji Murai, Tokyo (JP); Fumio Ohtomo, Tokyo (JP); Hitoshi Otani, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 10/501,260

(22) PCT Filed: Nov. 12, 2003

(86) PCT No.: PCT/JP03/14353

§ 371 (c)(1),
(2), (4) Date: May 12, 2005

(87) PCT Pub. No.: WO2004/044528

PCT Pub. Date: May 27, 2004

(65) Prior Publication Data

US 2005/0207621 A1 Sep. 22, 2005

(30) Foreign Application Priority Data

Nov. 13, 2002 (JP) .............................. 2002-330130

(51) Int. Cl.
*G01C 3/08* (2006.01)
(52) U.S. Cl. ....................... 356/4.03; 356/4.01; 356/4.1
(58) Field of Classification Search ................. 356/4.03
See application file for complete search history.

(56) References Cited

U.S. PATENT DOCUMENTS 6,473,166 B1 * 10/2002 Ohishi et al. ............. 356/141.1
2005/0243329 A1 * 11/2005 Ohtomo et al. ............. 356/601

FOREIGN PATENT DOCUMENTS

| EP | 1024342 | 8/2000 |
| EP | 1033556 | 9/2000 |
| JP | 2001033245 | 2/2001 |
| JP | 2001153652 | 8/2001 |

OTHER PUBLICATIONS

International Search Report mailed Apr. 20, 2004.

* cited by examiner

*Primary Examiner*—Thomas H. Tarcza
*Assistant Examiner*—Luke D. Ratcliffe
(74) *Attorney, Agent, or Firm*—Baker Botts L.L.P.

(57) ABSTRACT

The present invention relates to a surveying instrument for measuring the distance to a target to be measured, a horizontal angle, and a vertical angle by use of reflected light. An imager can be connected to the surveying instrument. In addition, an arithmetic processing means can determine a three-dimensional position of a plane part by determining from at least three measuring points an equation that includes the plane part as the target to be measured, and then by associating digital image data to which the plane part belongs with the equation so that the plane part is identified.

13 Claims, 8 Drawing Sheets

SURVEYING INSTRUMENT AND ELECTRONIC STORAGE MEDIUM

TECHNICAL FIELD

The present invention relates to a surveying instrument and an electronic storage medium, and more particularly to non-prism measurement that is capable of measuring a measuring point in corners.

BACKGROUND ART

A technique for performing three-dimensional measurement by use of a non-prism type total station (surveying instrument), which does not use a reflection member such as a corner cube, has been developed.

However, the problem to be solved was that, for example, when the outward appearance of a building is measured, it was extremely difficult to measure the edges (corners) of the building. Because the measurement is performed by use of a measuring light beam such as a laser light beam which is emitted from a non-prism type total station (surveying instrument), it is difficult to measure the edge.

DISCLOSURE OF INVENTION

The present invention has been devised taking the above-mentioned problem into consideration. An object of the present invention is to provide a surveying instrument for measuring the distance to a target to be measured, a horizontal angle, and a vertical angle by use of reflected light. An imager can be connected to the surveying instrument. In addition, an arithmetic processing means can determine a three-dimensional position of a plane part by determining from at least three measuring points an equation that includes the plane part as the target to be measured, and then by associating digital image data to which the plane part belongs with the equation so that the plane part is identified.

According to the present invention, it is also possible to determine a three-dimensional position of the plane part by extracting edges of at least two intersecting straight lines forming the plane part, and by determining the straight lines using the least-squares method or the conditional least-squares method on the basis of image data of the edges, and then by calculating an intersection point of the straight lines.

According to the present invention, if at least two plane parts successively intersect with each other, edges of three straight lines forming the angle are extracted, and on the basis of image data of the edges, the straight lines are determined by the least-squares method or the conditional least-squares method, and then the angle which is an intersection point of the straight lines is calculated to determine a three-dimensional position of the plane part.

According to the present invention, if the plane part includes a straight line, a position and the length of the straight line can also be calculated by specifying the straight line.

According to the present invention, if the plane part has a window bordered by straight lines, the window is specified to identify the window, which makes it possible to calculate a position and a shape of the window.

According to the present invention, if there is a point located on the plane part which is the target to be measured, it is also possible to determine the three-dimensional position by determining a center-of-gravity position of image data of the point, and then by associating the center-of-gravity position with the three measuring points.

According to the present invention, if the surveying instrument faces the target to be measured, it is also possible to calculate a three-dimensional position of the plane part by determining from a measured value of one point an equation which includes the plane part as the target to be measured, and then by associating digital image data to which the plane part belongs with the equation so that the plane part can be identified.

According to the present invention, a straight line or a window, which is included in a plane part, can also be specified by the collimation of a telescope included in the surveying instrument.

According to the present invention, a straight line or a window, which is included in the plane part, can also be specified by pointing an image displayed on a display unit included in the surveying instrument.

In addition, the edges can also be extracted by use of a spatial filter such as Laplacian.

A three-dimensional measurement method according to the present invention is used in a surveying instrument for measuring the distance to a target to be measured, a horizontal angle, and a vertical angle by use of reflected light. The surveying instrument is so devised that an imager for obtaining a digital image in a measurement direction can be connected to the surveying instrument. The three-dimensional measurement method-comprises the following steps: a first step for determining at least three measuring points of a plane part, and then for measuring the measuring points; a second step for determining an equation, which includes the plane part, from data of the distance and the angles of the three measuring points that have been obtained by the measurements; and a third step for associating the digital image data to which the plane part belongs with the equation. A three-dimensional position of the plane part can be determined from the image data that identifies the plane part and from the equation that includes the plane part.

An electronic storage medium such as a FD, a CD, a DVD, a RAM, a ROM, or a memory card is used when three-dimensional measurement is performed by use of data obtained from a surveying instrument and an imager, which measure the distance to a target to be measured, a horizontal angle, and a vertical angle using reflected light. As a result of executing an arithmetic processing means, it is possible to determine a three-dimensional position of a plane part by determining from at least three measuring points an equation that includes the plane part as the target to be measured, and then by associating digital image data to which the plane part belongs with the equation so that the plane part can be identified.

BEST MODES FOR CARRYING OUT THE INVENTION

Principles

Figure 1:
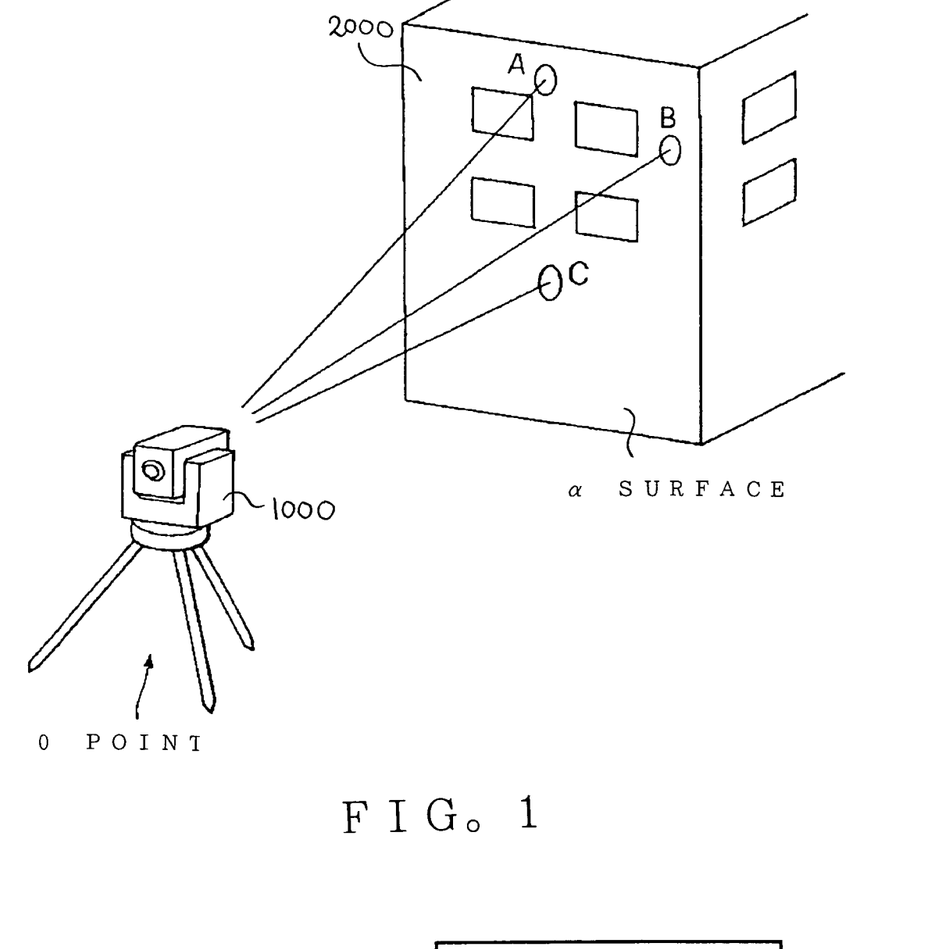
FIG. 1 is a diagram illustrating the principles of this embodiment.
Figure 2:
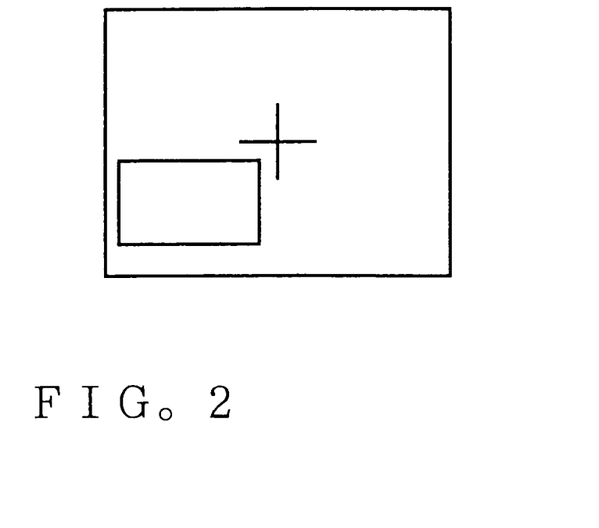
FIG. 2 is a diagram illustrating the principles of this embodiment.

Here, the principles will be described using an example in which as shown in FIGS. 1 and 2, three-dimensional coordinates (X, Y, Z) of a corner part 2000a of a building 2000 which is a target to be measured are measured. The principles are described by use of the building 2000 having planes formed of straight lines, and the like, which seem to be a main usage pattern of the present invention.

To begin with, as shown in FIG. 1, a surveying instrument which is placed at a reference point O, coordinates of which are known, collimates a α surface forming the building 2000. Three points (preliminary measuring points) substantially forming a triangle on the α surface are chosen, and then the distance to each point, a horizontal angle, and a vertical angle are measured.

On the basis of measured data, an equation of a plane which includes the preliminary measuring points is calculated. The plane which includes the preliminary measuring points includes the α surface.

It is to be noted that the measurement of a plane of a building or the like using a non-prism type surveying instrument is described in Japanese Patent Application Laid-Open No. Hei 2000-97703 by the applicant of the application concerned.

In addition to the measurement, digital image data of the building 2000 which is the object to be measured is obtained by the imager 100.

In a configuration in which an image is coaxial with the collimation, the center of the collimation coincides with the center of the image. Accordingly, a position in the image can be expressed as horizontal and vertical angles relative to the center of the collimation.

On the basis of the horizontal angle data and the vertical angle data relative to the center of the collimation center, the position in the image is calculated by the horizontal angle and the vertical angle.

An image pickup element such as an image sensor, which is used to obtain digital image data, is constituted of pixels that are arrayed in a matrix. A position of each pixel arranged in the image is known.

When a corner of a building formed of straight lines is determined, an equation of the straight lines is derived from the least-squares method or the conditional least-squares method on the basis of variations in light receiving of each pixel, and thereby it is possible to determine a position of an intersection point in the image as well as horizontal and vertical angles relative to the center of the image. The determined horizontal and vertical angles coincide with a horizontal angle and a vertical angle of the corner of the building on a α surface relative to the center of the collimation. Because the horizontal angle data and the vertical angle data of the center of the collimation are known, horizontal angle data and vertical angle data of the angle of the building can be immediately determined. If the distance from the center of the collimation is measured, it is possible to determine a three-dimensional position of the corner of the building by use of the determined equation of the α surface.

Incidentally, if the image is not coaxial with the collimation, proper corrections can also be made.

A first image pickup element 110 picks up a wide-angle image; and a second image pickup element 120 picks up a narrow-angle image. The wide-angle image and the narrow-angle image are associated with each other. The wide-angle image is suitable for the whole image or a close-range view; and the narrow-angle image is suitable for, for example, a magnified image, or a distant view.

Incidentally, if the magnification of the telescope can be zoomed in or out, one image pickup element can also be used as both the first image pickup element 110 and the second image pickup element 120.

In addition, an image of the telescope in proximity to the preliminary measuring point A is as shown in FIG. 2. Accordingly, aligning the image with a cross line also makes it possible to determine a preliminary measuring point in proximity to the window.

A position in the digital image is associated with measured data of the preliminary measuring point by surveying. The α surface to which the preliminary measuring point belongs is bordered by straight lines to thereby form a surface. When a position of the building is identified, more specifically, when a coordinate position is identified to survey the building, since the building is shaped like a box in many cases, identifying corners makes it possible to easily obtain its coordinates.

To begin with, edges of the straight lines forming the α surface of image data are extracted by image processing. With the object of the extraction of the edges, for example, a spatial filter such as the Laplacian is used to emphasize the edges. This Laplacian emphasizes the edges using a differential image.

Next, two straight lines, a first straight line L1 and a second straight line L2, which are formed in the upper wall of the building 2000, are determined on the basis of the image data. Then, based on the relationship between an intersection point of the two straight lines and a position of a preliminarily measuring point in the image, coordinates (X, Y, Z) of the corner part 2000a are determined.

The position of the preliminary measuring point is identified by a horizontal angle (direction angle) and a vertical angle from a known point as viewed from a reference point.

An equation of the two straight lines is determined by applying the least-squares method to image data variations.

The straight lines can be determined by, for example, the least-squares method.

On the assumption that the equation of the straight line is $y=ax+b$, the above description is given by the two straight lines, that is to say, the first straight line L1 and the second straight line L2. However, three or more straight lines may also be set so as to determine their intersection points.

In this case, there is exhibited an effect of increasing the accuracy of the intersection points.

It is possible to determine two straight lines a, b by use of the least-squares method as described below. It is to be noted that if the conditional least-squares method and/or the weighted least-squares method are used as the least-squares method, the straight lines can be determined with higher accuracy, and thereby the coordinates can be determined with higher accuracy. In case of the conditional least-squares method, by making it a condition that, for example, the outward appearance of the building is formed of perpendicular straight lines, the corner of the building is considered to exist on the straight lines, and a connected line is determined as a straight line. Thus, it is found that the building perpendicularly stands. The conditioning makes it possible to minimize the influence of distortion of an image optical system, and also to make a calculation process easy. Moreover, it is also possible to determine the coordinates with higher accuracy by applying the weighted least-squares method in which detection of receiving light on a pixel basis is taken into consideration.

Mathematical expression 1:

Solution of the least-squares method: in case of y=ax+b $$\begin{cases} x_1 a + b = y_1 \\ x_2 a + b = y_2 \\ \vdots \\ x_n a + b = y_n \end{cases} \Rightarrow \begin{bmatrix} x_1 & 1 \\ x_2 & 1 \\ \vdots & \vdots \\ x_n & 1 \end{bmatrix} \begin{bmatrix} a \\ b \end{bmatrix} = \begin{bmatrix} y_1 \\ y_2 \\ \vdots \\ y_n \end{bmatrix} \text{ or } AX = B$$

if $v_i = (x_i a + b) - y_i$, $$\begin{bmatrix} v_1 \\ v_2 \\ \vdots \\ v_n \end{bmatrix} = \begin{bmatrix} x_1 & 1 \\ x_2 & 1 \\ \vdots & \vdots \\ x_n & 1 \end{bmatrix} \begin{bmatrix} a \\ b \end{bmatrix} = \begin{bmatrix} y_1 \\ y_2 \\ \vdots \\ y_n \end{bmatrix} \text{ or } V = AX - B$$

$$\sum v_i^2 = V^t V = \text{minimum}$$

$$\frac{\partial V^t V}{\partial X} = 0 \quad \therefore A^t A X = A^t B$$

$$\begin{bmatrix} \sum x_i^2 & \sum x_i \\ \sum x_i & n \end{bmatrix} \begin{bmatrix} a \\ b \end{bmatrix} = \begin{bmatrix} \sum x_i y_i \\ \sum y_i \end{bmatrix}$$

$$a = \frac{n \sum x_i y_i - (\sum x_i)(\sum y_i)}{n \sum x_i^2 - (\sum x_i)^2},$$

$$b = \frac{(\sum x_i^2)(\sum y_i) - (\sum x_i)(\sum x_i y_i)}{n \sum x_i^2 - (\sum x_i)^2}$$

If the first straight line L1 is defined as $y=a_1 x+b_1$ (Equation 1) and if the second straight line L2 is defined as $y=a_2 x+b_2$ (Equation 2), an intersection point of these two straight lines can be virtually determined as the corner part 2000a of the building 2000, which corresponds to the edge.

Moreover, if the distance from the surveying instrument 1000 placed at the reference point to the preliminary measuring point 2000b, and data of a horizontal angle (direction angle) and of a vertical angular, are used, it is possible to calculate three-dimensional coordinates (X, Y, Z) of the measuring point.

To be more specific, three-dimensional coordinates ($X_b$, $Y_b$, $Z_b$) of the preliminary measuring point 2000b can be measured on the basis of coordinates of the reference position of the surveying instrument 1000, and also on the basis of the angle of orientation of this reference position. Therefore, the three-dimensional coordinates (X, Y, Z) of the corner part 2000a of the building 2000 which is on the same plane can be calculated.

Incidentally, the high accuracy cannot be achieved through only the image processing. For example, although the edges of the image of the building are straight lines, data forming an image linearly varies because there is also a pixel that is partially received. For this reason, if a position of the corner of the building is determined on the basis of image data, it is not possible to achieve the accuracy that is higher than the fineness of the arranged pixels.

What was described above is the case where the building 2000, or the like, which is the target to be measured, is obliquely collimated. This is a state of substantially facing each other. When collimating a position substantially perpendicular to the plane part, to be exact, surveying by three points is required. However, even surveying by one point will not produce a practical problem. In case of the one-point surveying, even one point suffices instead of three-point surveying.

Furthermore, in the above description, the plane part is determined on the basis of the detection of the edges of the straight lines. However, the following method can also be used: detecting an intersection point in a plane part, or a mere center-of-gravity position of a point, from image data; and thereby determining its intersection point or a three-dimensional position of the point.

DETAILED DESCRIPTION OF THE PREFERRED EMBODIMENTS

Embodiments of the present invention will be described with reference to drawings as below.

Figure 8:
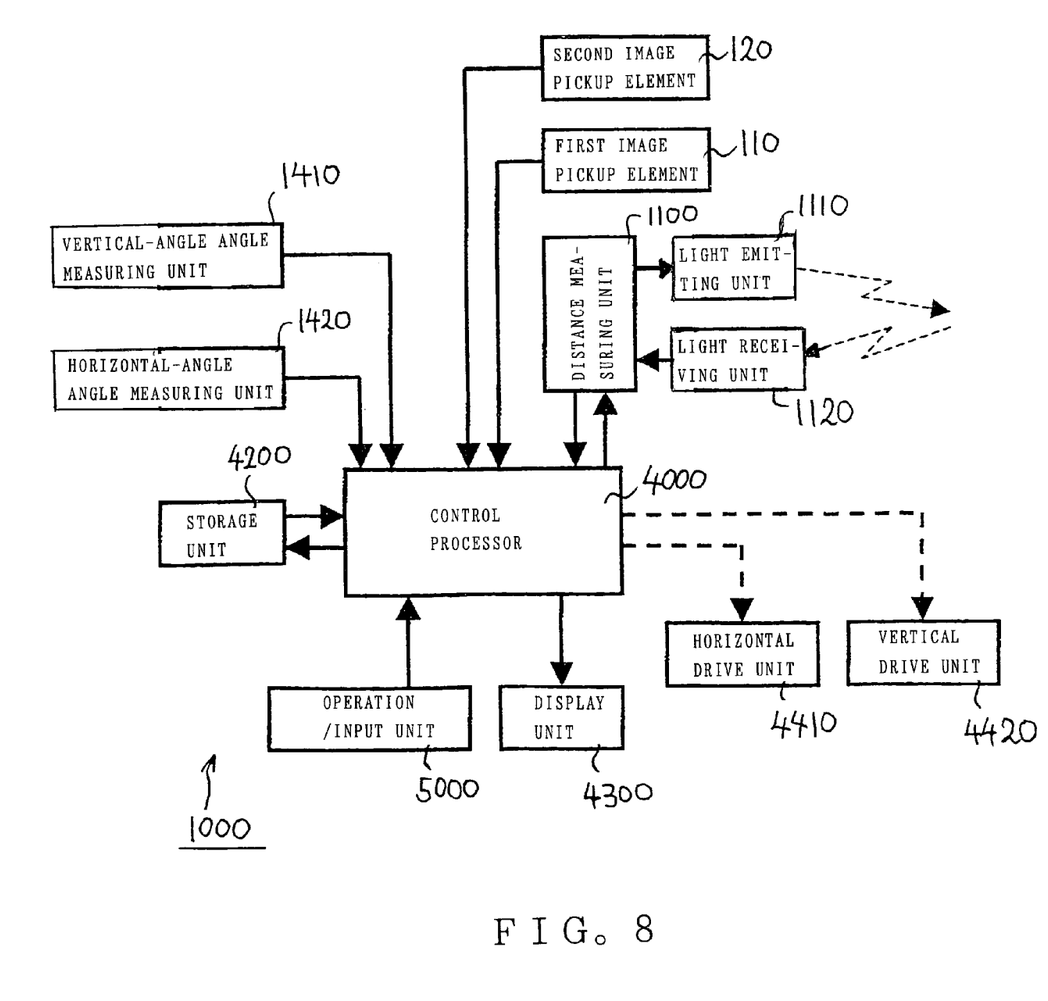
FIG. 8 is a diagram illustrating a surveying instrument 1000 according to the embodiment of the present invention.
Figure 9:
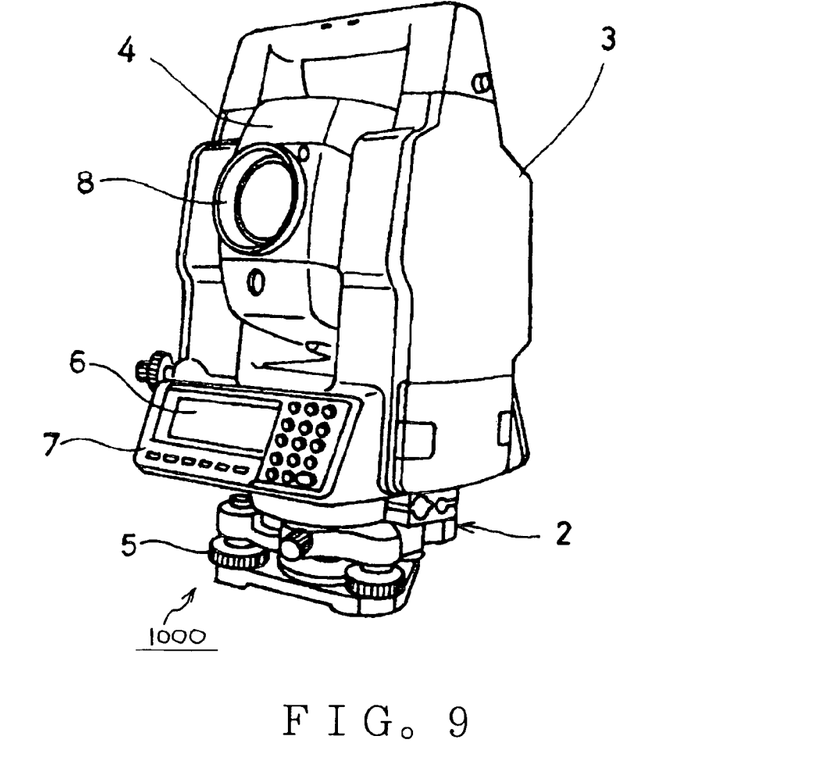
FIG. 9 is a diagram illustrating a surveying instrument 1000 according to the embodiment of the present invention.

As shown in FIGS. 8 and 9, a surveying instrument 1000 is a total station, which comprises an electronic theodolite for detecting angles (a vertical angle and a horizontal angle), and a light-wave range finder.

The surveying instrument 1000 comprises the following: a telescope unit 4; a frame 3 for supporting the telescope unit 4 so that the telescope unit 4 can swing up and down; and a base 2 for supporting the frame 3 so that the frame 3 can turn horizontally. The base 2 can be connected to a tripod, or the like, through a leveling plate 5.

The surveying instrument 1000 is provided with an operation panel 7 which is a part of operation/input unit 5000. A display 6 which is a part of a display unit 4300 is attached to the surveying instrument 1000. Moreover, an objective lens 8 is projected from the telescope unit 4.

An imager 100 is used to convert data of an image device into digital data. For example, the imager 100 is an electron camera such as a digital camera. This imager 100 comprises a first imager 110 for picking up a wide-angle image, and a second imager 120 for picking up a narrow-angle image.

Figure 10:
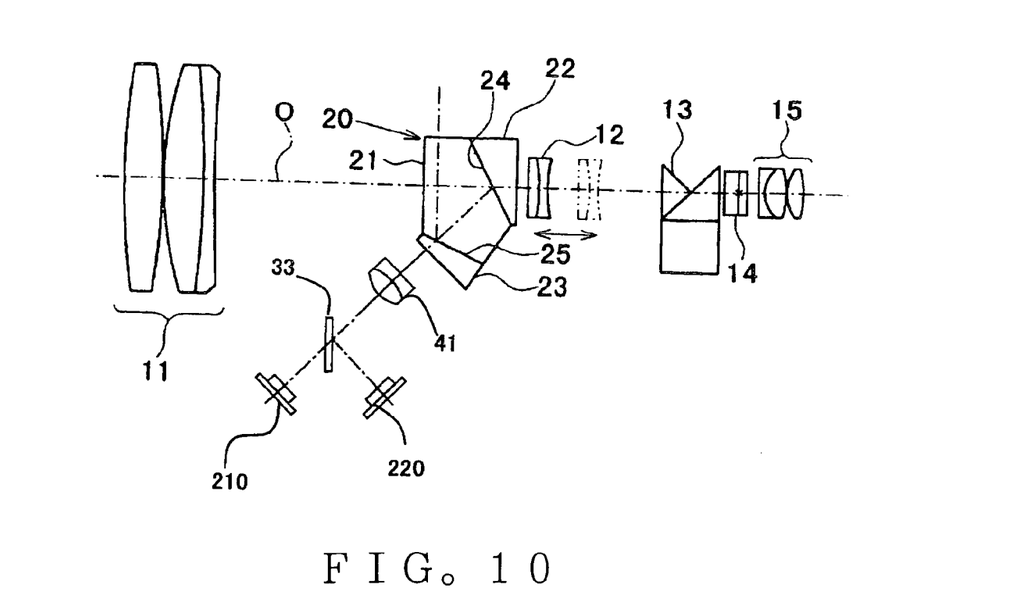
FIG. 10 is a diagram illustrating a telescope unit 4.

Here, an optical configuration of the telescope unit 4 will be described with reference to FIG. 10.

The telescope unit 4 comprises the objective lens 8, a dichroic mirror 20, a condensing lens 41, a third half mirror 33, a first image sensor 210, a second image sensor 220, and a focus lens 12.

The dichroic mirror 20 includes a first prism 21, a second prism 22, and a third prism 23. The dichroic mirror 20 includes a first half mirror 24 and a second half mirror 25.

It is so devised that a light beam incident from the objective lens 8 enters into the dichroic mirror 20, a measuring light beam and a part of visible light are reflected by the first half mirror 24, and then through the condensing lens 41, an image is formed in both a first image sensor 210 and a,second image sensor 220.

Only the measuring light beam is reflected in the second half mirror 25, and thereby the distance is measured.

After the light beam has passed through the condensing lens 41, a part of the light beam is reflected by the third half mirror 33, and its image is formed in the second image sensor 220. In addition, the light beam which has passed through the third half mirror 33 results in image formation in the first image sensor 210.

A control processor 4000 instructs a display unit 4300 to display a light receiving signal that has been received by the first image sensor 210 and by the second image sensor 220. Incidentally, the first image sensor 210 is associated with the first imager 110, and the second image sensor 220 is associated with the second imager 120.

The light beam which has passed through the first half mirror 24 is introduced into an eyepiece through the focus lens 12.

Next, an electric configuration of the surveying instrument 1000 according to this embodiment will be described with reference to FIG. 8.

The surveying instrument 1000 comprises a distance measuring unit 1100, an angle measuring unit 1400, a storage unit 4200, the display unit 4300, a drive unit 4400, the control processor 4000, and the operation/input unit 5000. Here, the storage unit 4200 is used to store data, a program, and the like. The display unit 4300 and the operation/input unit 5000 enable a user to operate the surveying instrument 1000.

The distance measuring unit 1100 uses a non-prism type light-wave range finder. The distance measuring unit 1100 comprises a light emitting unit 1110 and a light receiving unit 1120. The light emitting unit 1110 emits a distance measuring light beam in a direction of a target to be measured. A light beam reflected from the target to be measured enters into the light receiving unit 1120, and thereby the distance to the target to be measured can be measured.

To be more specific, the distance from the surveying instrument 1000 to the target to be measured is calculated by the time difference from the time when the light emitting unit 1110 emits pulses of light until the light receiving unit 1120 receives the pulses of light. It is to be noted that this arithmetic operation is executed by the control processor 4000.

An angle measuring unit 1400 comprises a vertical-angle angle measuring unit 1410 and a horizontal-angle angle measuring unit 1420. In this embodiment, a horizontal angle encoder and a vertical angle encoder are used. Each of the horizontal and vertical angle encoders includes a rotor mounted on the turning unit, and a stator in which a fixed unit is formed. Incidentally, the angle measuring unit 1400 corresponds to an angle detector.

The drive unit 4400 comprises a horizontal drive unit 4410 and a vertical drive unit 4420. By use of a motor, the drive unit 4400 can turn the surveying instrument 1000 both in the horizontal direction and in the vertical direction.

The control processor 4000 includes a CPU, and executes various kinds of arithmetic operation.

Figure 3:
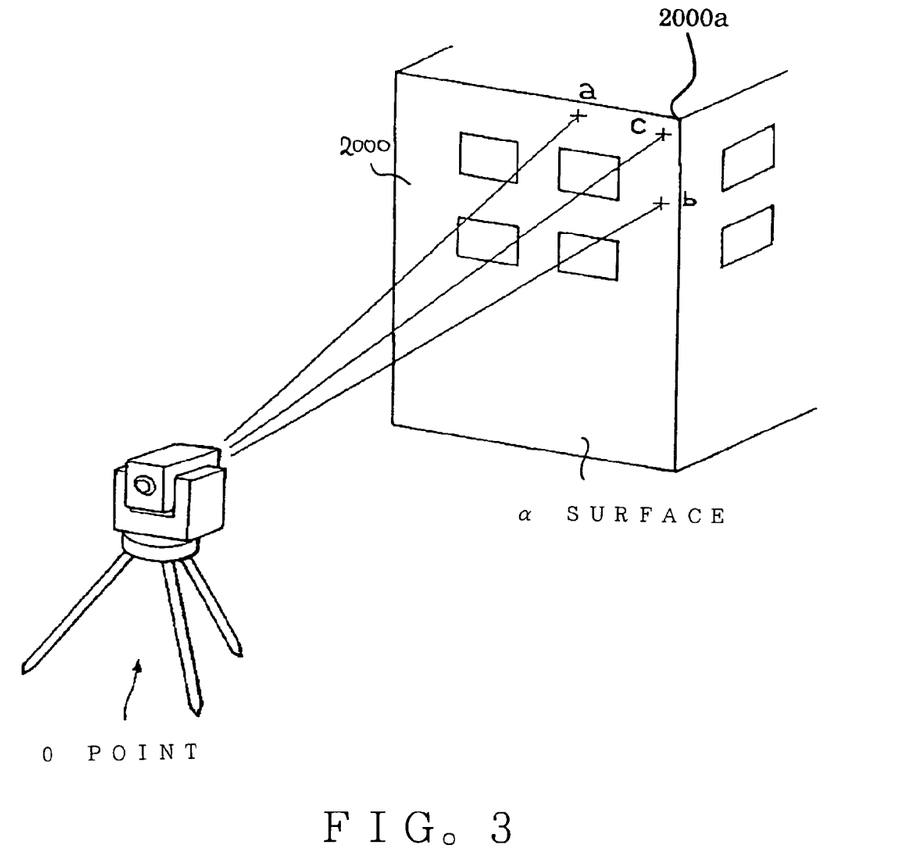
FIG. 3 is a diagram illustrating the principles of this embodiment.
Figure 6:
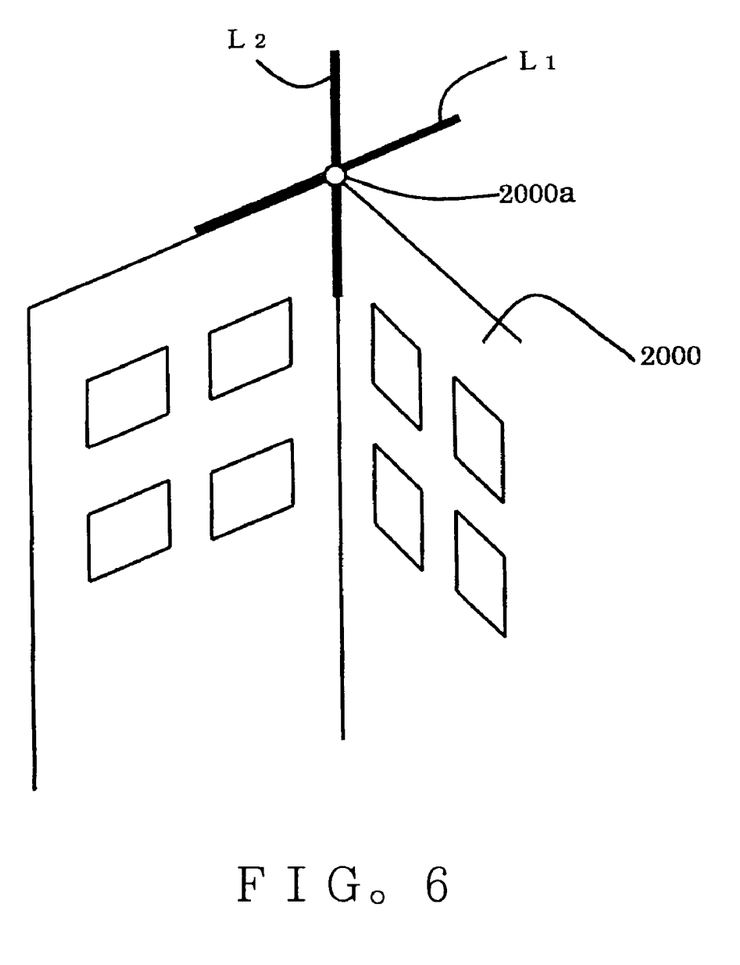
FIG. 6 is a diagram illustrating the principles of this embodiment.

Next, one example will be described. In the example, as shown in FIGS. 3 and 6, three-dimensional coordinates (X, Y, Z) of the corner part 2000a of the building 2000 which is a target to be measured are measured.

Figure 11:
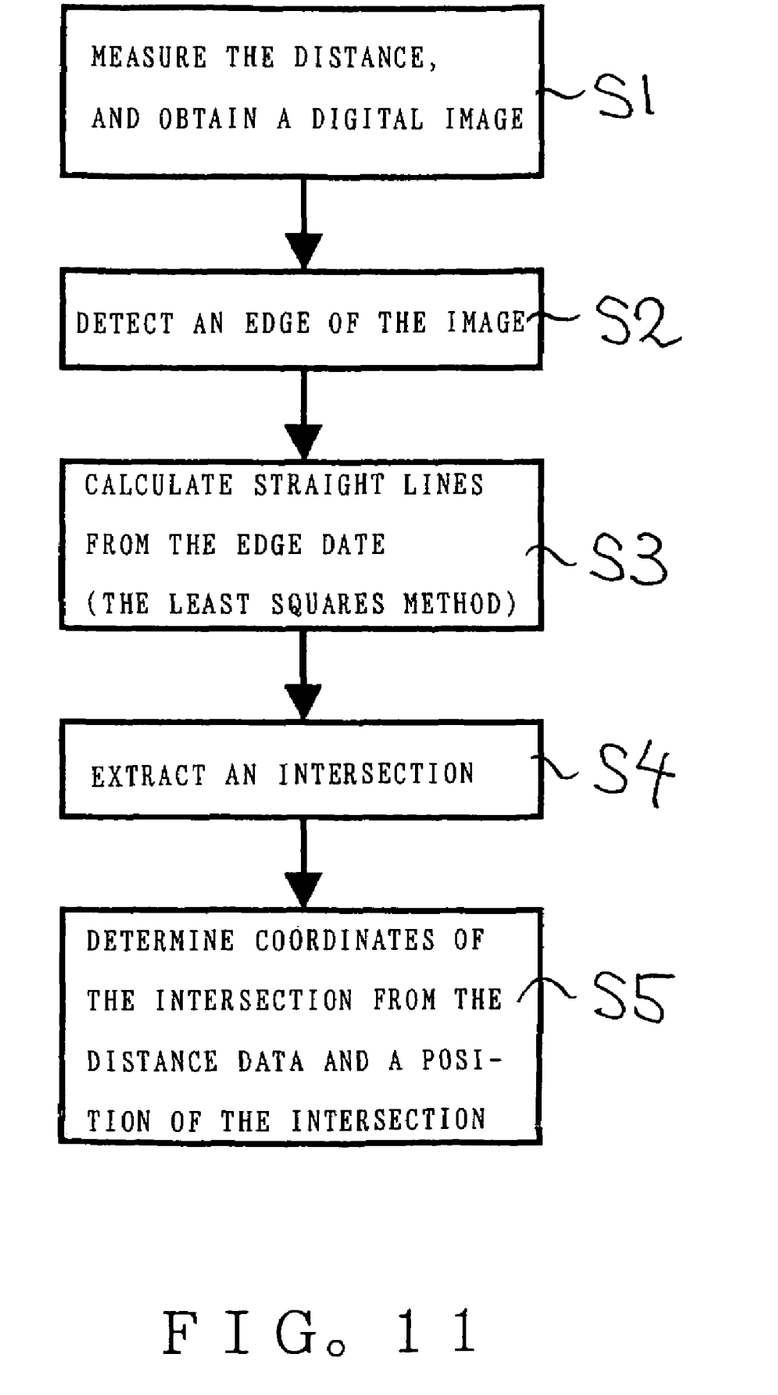
FIG. 11 is a diagram illustrating the operation of this embodiment.

To begin with, as shown in FIG. 11, in a step 1 (hereinafter "step" is abbreviated to S), three points are properly determined as preliminary measuring points A, B, C on a wall surface in proximity to the corner part 2000a in FIG. 3. Next, the distance measuring unit 1100 of the surveying instrument 1000 measures the distance to the preliminary measuring points A, B, C and a horizontal angle and a vertical angle. In addition, the imager 100 picks up an image of the building 2000 which is the target to be measured. The imager 100 allows the first imager 110 to pick up a wide-angle image, and the second imager 120 to pick up a narrow-angle image. Accordingly, either of them is selected if necessary.

Next, in a step S2, from the image obtained by the imager 100, an operation unit 1300 of the surveying instrument 1000 specifies straight lines in proximity to the preliminary measuring points A, B, C that have been measured by the surveying instrument 1000. To be more specific, straight lines forming the corner of the building 2000 are extracted.

The operation unit 1300 of the surveying instrument 1000 can emphasize edges by use of a spatial filter such as Laplacian.

Moreover, in a step S3, the operation unit 1300 of the surveying instrument 1000 determines two straight lines, a first straight line L1 and a second straight line L2, forming the corner of the building 2000. The straight lines can be determined by, for example, the least-squares method or the conditional least-squares method.

Next, in a step S4, the operation unit 1300 of the surveying instrument 1000 can determine coordinates (X, Y, Z) of the angle part 2000a from the preliminary measuring points and an intersection point of the two straight lines.

To be more specific, because the surveying instrument 1000 can measure three-dimensional coordinates of the preliminary measuring points A, B, C, the operation unit 1300 of the surveying instrument 1000 can calculate three-dimensional coordinates (X, Y, Z) of the corner part 2000a of the building 2000 which is on the same plane identified by the preliminary measuring points A, B, C.

Figure 4:
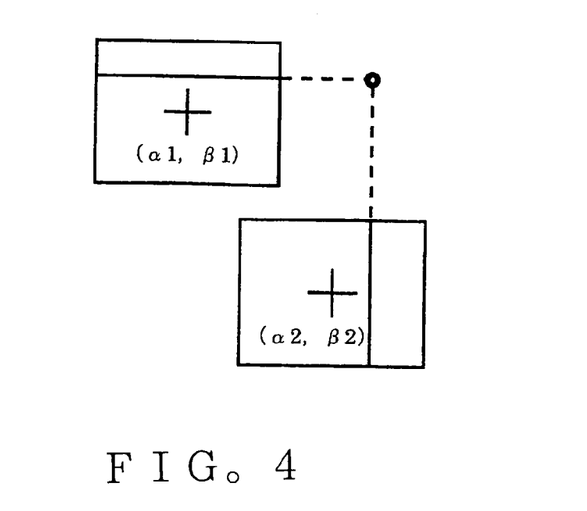
FIG. 4 is a diagram illustrating the principles of this embodiment.
Figure 5:
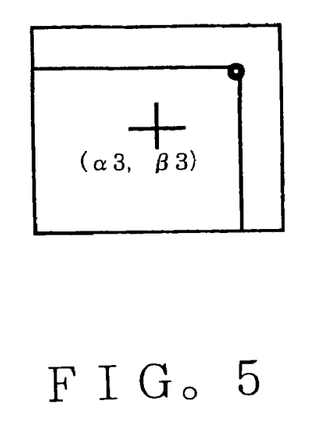
FIG. 5 is a diagram illustrating the principles of this embodiment.

Moreover, an image of the telescope is formed as shown in FIG. 4. Accordingly, positioning a cross line to a place near from the straight line makes it possible to determine the preliminary measuring point A ($\alpha 1$, $\beta 1$) in proximity to the first straight line L1, and the preliminary measuring point B ($\alpha 2$, $\beta 2$) in proximity to the second straight line L2. Further, as shown in FIG. 5, positioning a cross line to the preliminary measuring point C ($\alpha 3$, $\beta 3$) in proximity to the corner also enables the determination.

Figure 12:
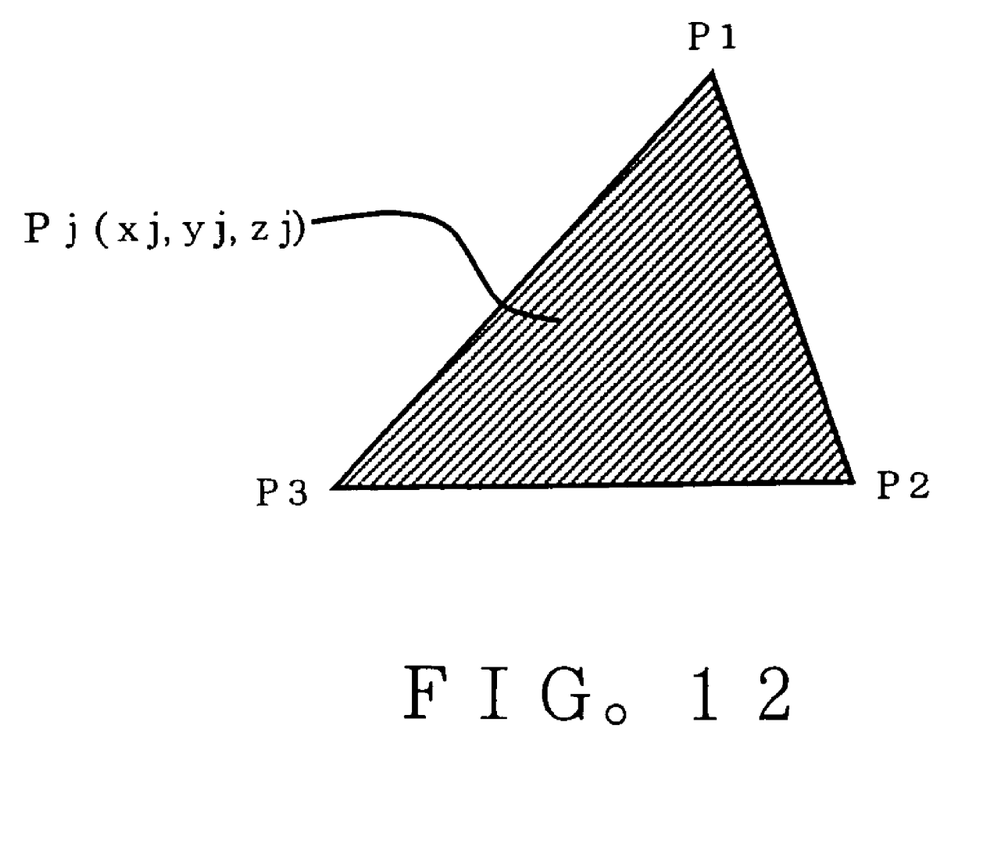
FIG. 12 is a diagram illustrating the principles of this embodiment.

How to calculate the height (depth) Z will be described with reference to FIG. 12.

An equation of a plane formed by a triangle $\Delta P_1 P_2 P_3$ is expressed as below.

$$a'X + b'Y + c' = Z \qquad \text{(Equation 3)}$$

where, if $P_1$ ($x_1$, $y_1$, $z_1$), $P_2$ ($x_2$, $Y_2$, $z_2$), $P_3$ ($X_3$, $y_3$, $Z_3$) are known, following Equation 4 holds true:

$$\begin{pmatrix} x_1 & y_1 & 1 \\ x_2 & y_2 & 1 \\ x_3 & y_2 & 1 \end{pmatrix} \begin{pmatrix} a' \\ b' \\ c' \end{pmatrix} = \begin{pmatrix} z_1 \\ z_2 \\ z_3 \end{pmatrix} \qquad \text{(Equation 4)}$$

Solving this equation 4 as simultaneous equations makes it possible to determine a', b', c'.

If a', b', c' are determined, the height of all vertexes of the triangle ($P_1$, $P_2$, $P_3$) can be calculated by:

$$z_j = a'x_j + b'y_j + c'$$

This is called TIN (triangular net).

Figure 7:
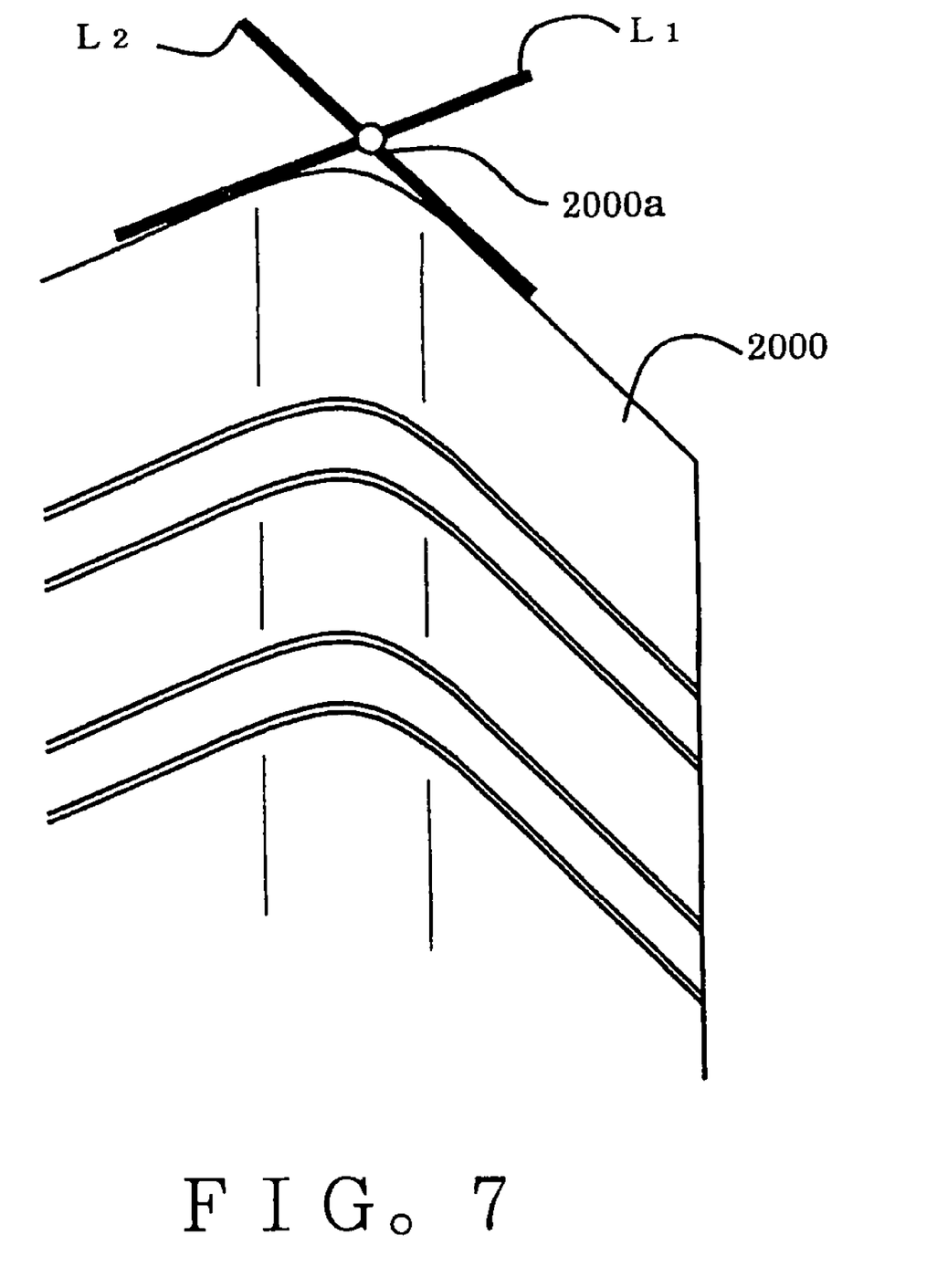
FIG. 7 is a diagram illustrating the principles of this embodiment.

FIG. 7 illustrates a building having no corner part. In this case, two planes orthogonal to the building 2000 are first determined. Then, on the assumption that their straight lines are extended to form a corner part, its three-dimensional position is calculated, and thereby coordinates of the position are determined. Moreover, each window shown in FIG. 3 is a part bordered by straight lines. Therefore, if a window is specified, applying an equation of the straight lines makes it possible to identify a position of the window relative to a α surface, and a shape of the window.

In addition, if a plane part includes a straight line, specifying the straight line also makes it possible to calculate a position and the length of the straight line.

Moreover, if the plane part has a window bordered by straight lines, specifying the window to identify the window also make it possible to calculate a position of the window.

Further, it is also possible to specify a straight line or a window, which is included in a plane part, by the collimation of the telescope provided on the surveying instrument.

Furthermore, it is also possible to specify a straight line or a window, which is included in the plane part, by pointing an image displayed on the display unit included in the surveying instrument.

It is to be noted that a program which describes operational steps to be performed by the operation unit 1300 of the surveying instrument 1000 can be stored in an electronic storage medium such as a FD, a CD, a DVD, a RAM, a ROM, and a memory card.

In order to increase the accuracy, it is necessary to precisely calibrate both the surveying instrument 1000 and the imager 100.

The present invention which is configured as above is a surveying instrument for measuring the distance to a target to be measured, a horizontal angle, and a vertical angle by use of reflected light. It is so devised that an imager for obtaining a digital image which is associated with both a horizontal angle and a vertical angle can be connected to this surveying instrument. The surveying instrument comprises an arithmetic processing means for determining a three-dimensional position of a plane part by determining from at least three measuring points an equation that includes the plane part as a target to be measured, and then by associating digital image data to which the plane part belongs with the equation so that the plane part is identified. Accordingly, even if non-prism measurement is used, a measuring point in a corner part can be measured, which is a produced effect.

INDUSTRIAL APPLICABILITY

The present invention relates to a surveying instrument, and more particularly to non-prism measurement that is capable of measuring a measuring point in a corner part. An imager can be connected to this surveying instrument. In addition, an arithmetic processing means can determine a three-dimensional position of a plane part by determining from at least three measuring points an equation that includes the plane part as a target to be measured, and then by associating digital image data to which the plane part belongs with the equation so that the plane part is identified.

The invention claimed is:

1. A surveying instrument for measuring distance, horizontal angle, and vertical angle by use of reflected light, comprising:
   an imager for obtaining a digital image which is associated with a plane part; and
   an arithmetic processing means for calculating a three-dimensional position of said plane part by
   determining an equation that includes said plane part by measuring distance, horizontal angle, and vertical angle to each of at least three points substantially forming a triangle on said plane part;
   associating digital image data to which said plane part belongs with said equation so that said plane part can be identified;
   extracting edges of at least two intersecting straight lines forming said plane part;
   determining said straight lines based on image data related to said edges by the least-squares method or the conditional least-squares method; and
   calculating an intersection point of said straight lines to determine said three-dimensional position of said plane part.

2. A surveying instrument according to claim 1, wherein: if at least two plane parts successively intersect with each other, edges of three straight lines forming the angle are extracted, and on the basis of image data of the edges, the straight lines are determined by the least-squares method or the conditional least-squares method, and then the angle which is an intersection point of the straight lines is calculated to determine a three-dimensional position of the plane part.

3. A surveying instrument according to claim 1, wherein: if the plane part includes a straight line, a position and the length of the straight line are calculated by specifying the straight line.

4. A surveying instrument according to claim 1, wherein: if the plane part has a window bordered by straight lines, the window is specified to identify the window to calculate a position and a shape of the window.

5. A surveying instrument according to claim 1, wherein: if there is a point located on the plane part which is the target to be measured, a center-of-gravity position of image data of the point is determined, and then the center-of-gravity position is associated with the three measuring points to determine the three-dimensional position.

6. A surveying instrument according to claim 1, wherein: if said surveying instrument faces the target to be measured, an equation which includes the plane part as the target to be measured is determined from a measured value of one point, and then digital image data to which the plane part belongs is associated with the equation so that the plane part can be identified, and thereby its three-dimensional position is calculated.

7. A surveying instrument according to claim 3 or 4, wherein: a straight line or a window, which is included in a plane part, is specified by the collimation of a telescope included in the surveying instrument.

8. A surveying instrument according to claim 3 or 4, wherein: a straight line or a window, which is included in the plane part, is specified by pointing an image displayed on a display unit included in the surveying instrument.

9. A surveying instrument according to claim 1, wherein: the edges are extracted by use of a spatial filter such as Laplacian.

10. A three-dimensional measurement method used in a surveying instrument for measuring the distance to a target to be measured, a horizontal angle, and a vertical angle by use of reflected light, said surveying instrument being configured so that an imager for obtaining a digital image in a measurement direction is connectable to the surveying instrument, said three-dimensional measurement method comprising:
   determining at least three measuring points of a plane part, and then for measuring the measuring points;
   determining an equation, which includes the plane part, from data of the distance and the angles of the three measuring points obtained by the measurements;

associating the digital image data to which the plane part belongs with the equation, extracting edges of at least two intersecting straight lines forming said plane part;

determining said straight lines based on image data related to said edges by the least-squares method or the conditional least-squares method; and calculating an intersection point of said straight lines to determine said three-dimensional position of said plane part;

wherein: a three-dimensional position of the plane part is determined from the image data that identifies the plane part and from the equation which includes the plane part.

11. An electronic storage medium such as a FD, a CD, a DVD, a RAM, a ROM, or a memory card, wherein: said electronic storage medium is used when performing three-dimensional measurement by use of data obtained from a surveying instrument and an imager, which measure the distance to a target to be measured, a horizontal angle and a vertical angle using reflected light; and said electronic storage medium stores a program describing operation steps for determining a three-dimensional position of a plane part by determining from at least three measuring points an equation which includes the plane part as the target to be measured, associating digital image data to which the plane part belongs with the equation so that the plane part is identified, extracting edges of at least two intersecting straight lines forming said plane part, determining said straight lines based on image data related to said edges by the least-squares method or the conditional least-squares method, and calculating an intersection point of said straight lines to determine said three-dimensional position of said plane part;

said operation steps being executed by an arithmetic processing means.

12. An electronic storage medium according to claim 11, wherein: edges of at least two intersecting straight lines forming a plane part are extracted, and on the basis of image data of the edges, the straight lines are determined by the least-squares method or the conditional least-squares method, and then an intersection point of the straight lines is calculated to determine a three-dimensional position of the plane part.

13. An electronic storage medium according to claim 11, wherein: if at least two plane parts successively intersect with each other, edges of three straight lines forming the angle are extracted, and on the basis of image data of the edges, the straight lines are determined by the least-squares method or the conditional least-squares method, and then the angle which is an intersection point of the straight lines is calculated to determine a three-dimensional position of the plane part.

* * * * *